(12) United States Patent
Gaufin (10) Patent No.: US 9,297,392 B2
(45) Date of Patent: Mar. 29, 2016

(54) DEFLECTION SPRING PNEUMATIC ACTUATOR

(71) Applicant: TSE Brakes, Inc., Cullman, AL (US)

(72) Inventor: Carl Gaufin, Hanceville, AL (US)

(73) Assignee: TSE Brakes, Inc., Cullman, AL (US)

( * ) Notice: Subject to any disclaimer, the term of this patent is extended or adjusted under 35 U.S.C. 154(b) by 250 days.

(21) Appl. No.: 13/919,082

(22) Filed: Jun. 17, 2013

(65) Prior Publication Data

US 2014/0096677 A1 Apr. 10, 2014

Related U.S. Application Data

(60) Provisional application No. 61/660,131, filed on Jun. 15, 2012.

(51) Int. Cl.
| | |
|---|---|
| *B60T 17/08* | (2006.01) |
| *F15B 15/02* | (2006.01) |
| *F16D 65/28* | (2006.01) |
| *F16D 121/08* | (2012.01) |
| *F16D 121/10* | (2012.01) |
| *F16D 123/00* | (2012.01) |

(52) U.S. Cl.
CPC .............. *F15B 15/02* (2013.01); *B60T 17/083* (2013.01); *F16D 65/28* (2013.01); *F16D 2121/08* (2013.01); *F16D 2121/10* (2013.01); *F16D 2123/00* (2013.01)

(58) Field of Classification Search
CPC ....... B60T 17/083; B60T 13/04; B60T 17/08; F16D 2121/02; F16D 65/28; F15B 15/02

USPC ........ 92/96, 94, 130 A, 130 B; 267/160, 182; 188/106 F, 153 D, 153 R
See application file for complete search history.

(56) References Cited

U.S. PATENT DOCUMENTS

| | | | | |
|---|---|---|---|---|
| 3,813,994 A | * | 6/1974 | Swander et al. ................ | 91/471 |
| 4,613,119 A | | 9/1986 | Hardtke | |
| 5,829,339 A | | 11/1998 | Smith | |
| 5,836,233 A | * | 11/1998 | Rumsey ............................ | 92/63 |
| 5,937,733 A | * | 8/1999 | Stojic ................................ | 92/63 |

(Continued)

FOREIGN PATENT DOCUMENTS

| | | | |
|---|---|---|---|
| DE | 10110843 A1 | * | 9/2002 |
| EP | 0 070 106 | | 1/1983 |

OTHER PUBLICATIONS

European Extended Search Report mailed Oct. 10, 2015, EP Patent Application No. 13172321.5.

*Primary Examiner* — Dwayne J White
*Assistant Examiner* — Abiy Teka
(74) *Attorney, Agent, or Firm* — Andrus Intellectual Property Law, LLP (57) ABSTRACT

A pneumatic actuator includes a housing defining a chamber. A diaphragm is positioned within the chamber. A rod member is attached to the diaphragm and is movable between a first position and a second position. A cam member is attached to the diaphragm and to the rod member. The cam member has a cam surface. A deflection rod has a first end portion and a second end portion, where the first end portion of the deflection rod is attached to the housing. A follower is attached to the second end portion of the deflection rod. The follower engages the cam surface of the cam member so as to urge the rod member towards the second position.

20 Claims, 7 Drawing Sheets

(56) References Cited

U.S. PATENT DOCUMENTS 6,477,939 B1 * 11/2002 Siebke ..................... 92/130 R
6,511,255 B1 1/2003 Mainardi
2010/0294601 A1 11/2010 Kraus

* cited by examiner

DEFLECTION SPRING PNEUMATIC ACTUATOR

CLAIM OF PRIORITY

This application claims priority to U.S. Provisional Patent Application No. 61/660,131, filed Jun. 15, 2012, the contents of which are hereby incorporated by reference.

FIELD OF THE INVENTION

The present invention relates generally to air brake systems for vehicles and, in particular, to a deflection spring for the pneumatic actuator of such a system.

BACKGROUND

Heavy trucks, trailers and other commercial vehicles typically use an air brake system to provide the braking forces necessary to stop the vehicle. Such a system typically includes a brake pedal positioned on the floor of the driver's cab or compartment of the vehicle that, upon actuation, provides air from an air reservoir to an air chamber. The air chamber acts as a pneumatic actuator in that it features an actuator rod that either extends out of or retracts into the air chamber so as to activate the mechanism that pushes the brake lining material of the brake shoes against the vehicle brake drum at each vehicle wheel-end. The mechanism typically includes a slack adjustor which turns a cam roller via a camshaft so as to force the brake shoes to engage the brake drum so as to stop the vehicle.

An example of a prior art pneumatic or air chamber of such an air brake system is described in U.S. Pat. No. 5,829,339 to Smith, the contents of which are hereby incorporated by reference.

Cross-sectional views of a prior art air chamber are also provided in FIGS. 1A-1D. As explained in greater detail below, with reference to FIGS. 1A-1D, a large main compression spring 10 (also known as a parking spring or a power spring) serves as a mechanical means to prevent the vehicle from rolling when there is no air in the brake system and when the vehicle is stationary or parked. This spring supplies the parking force needed to hold the vehicle stationary. A larger or stronger spring typically means that a larger parking force can be achieved.

Figure 1A:
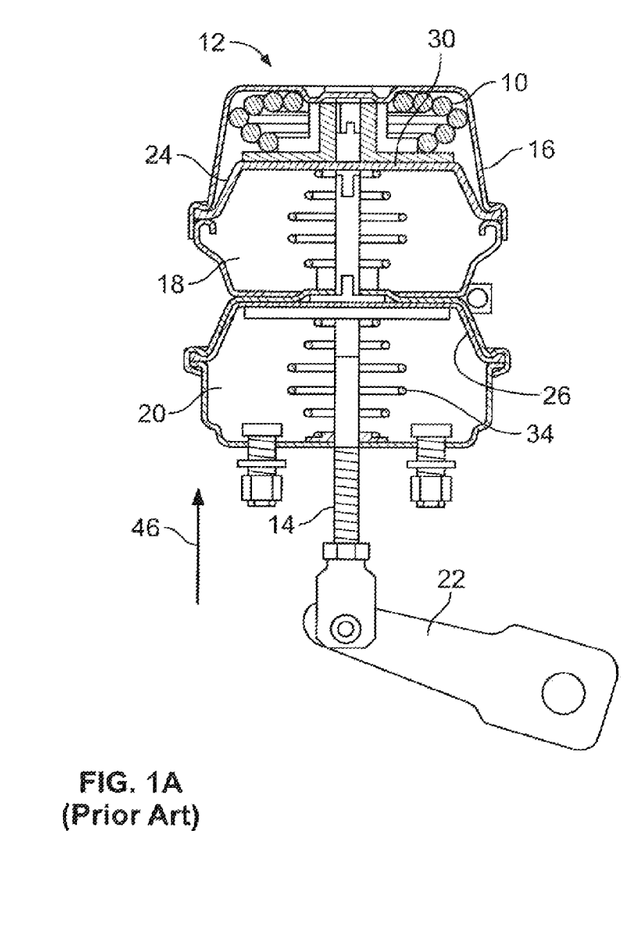
FIGS. 1A-1D are cross-sectional views of a prior art air chamber or pneumatic actuator with the parking chamber pressurized, both the parking and service chambers pressurized, the main spring engaged (with neither the parking nor the service chambers pressurized) and the main spring mechanically caged with a release tool, respectively.
Figure 1B:
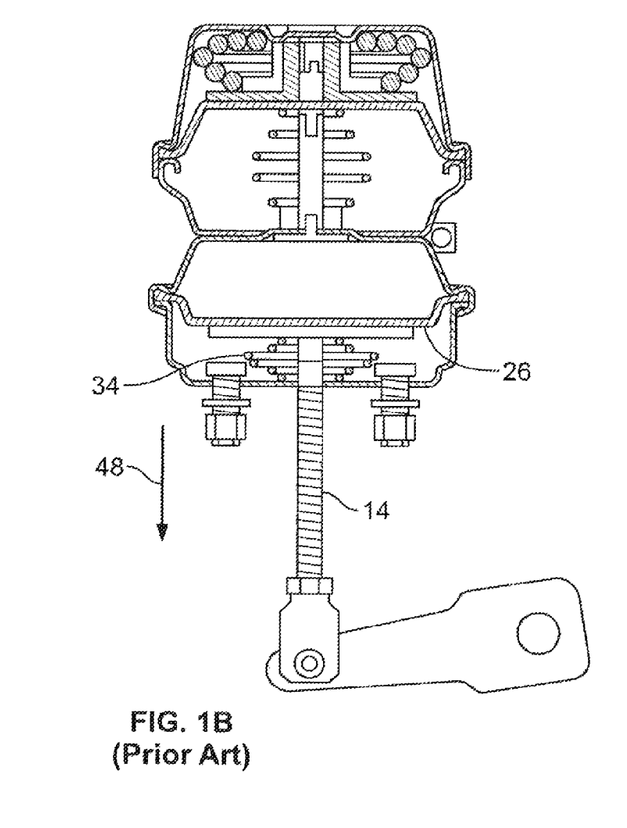
Figure 1C:
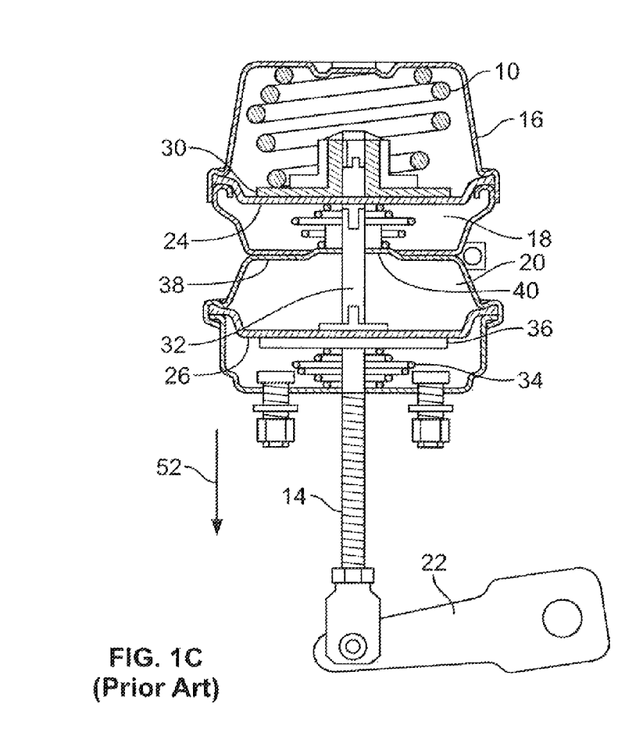

One problem with such a design is that a great deal of air pressure is needed to keep the main spring from applying the brake and thereby maintain the spring in a compressed state (illustrated in FIG. 1A). Also as the brake applies and the main spring 10 extends (as illustrated in FIG. 1C), one is not able to capitalize on the high amount of force that the spring exhibits in the compressed state (due to the equation Spring Force=K×X, where K is the spring constant and X is the compression distance of the spring). To this end, the main spring is subjected to very high compressive forces when in the condition of FIGS. 1A, 1B and 1D that are never translated to the parking brake force for the vehicle.

In addition, while in the compressed state (FIG. 1A) the main spring coils are close together and could be touching. This contact, combined with the vibrations experienced by the axle and vehicle as it drives, could cause an increase in wear in the spring coils. This wear could possibly break through the spring plating and damage the spring surface creating high stress areas and, without a protective coating, the spring would be subject to corrosion. The resulting rust pits become stress risers that will shorten the life of the spring.

A coil spring failure can result in a punctured diaphragm or a reduction in stroke, parking force, or the inability to completely release a brake for a given wheel-end of the vehicle. As such, much work must be put into protecting the spring from corrosion and also from individual coil contact.

DETAILED DESCRIPTION OF EMBODIMENTS

As noted above, FIGS. 1A-1D provide cross-sectional views of a prior art air chamber or pneumatic actuator, indicated in general at 12. While the invention is described in terms an air chamber for an air brake system of a vehicle, it is to be understood that the deflection spring of the present invention may be used in other types of pneumatic actuators for a variety of purposes.

Figure 1D:
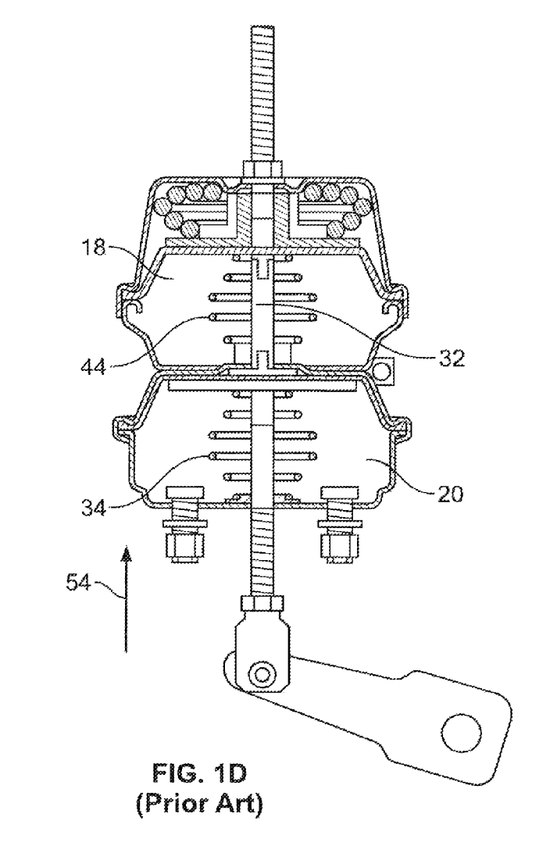

The air chamber includes an actuator rod 14 and a housing 16 that defines a parking chamber 18 and a service chamber 20 (FIGS. 1A, 1C and 1D). The bottom end of the actuator rod is connected to a lever arm 22 that attaches the actuator rod to a slack adjustor or a camshaft upon which the cam roller (for actuating the brake shoes) is positioned. An upper diaphragm 24 is positioned within the parking chamber while a lower diaphragm 26 is positioned in the service chamber. The main compression spring 10 is positioned between an upper plate 30, which is mounted to the top end of a push rod 32 (FIGS. 1C and 1D) and the upper diaphragm, and the top of the housing 16. A lower compression spring 34 is mounted between a lower plate 36, which is mounted to the top end of the actuator rod and the lower diaphragm, and the bottom of housing 16. A chamber divider wall 38 positioned within the housing separates the parking and service chambers and has a central opening 40 through which the push rod 32 passes. An upper compression spring 44 (FIG. 1D) is positioned between the top of the chamber divider wall 38 and the bottom of upper diaphragm 24 and upper plate 30.

In operation, as illustrated in FIG. 1A, when parking chamber 18 is pressurized, upper diaphragm 24, upper plate 30, push rod 32, lower diaphragm 26 and lower plate 36, and thus the actuator rod 14, move upwards, as indicated by arrow 46. This causes main spring 10 to be compressed, while the upper and lower springs extend. As a result, the vehicle brakes are released and the vehicle may be driven. When the vehicle driver presses down on the vehicle brake pedal, the service chamber is pressurized, as illustrated in FIG. 1B. This cause the lower diaphragm 26 to move down and the lower spring 34 to be compressed. As a result, actuator rod 14 moves down, as indicated by arrow 48, and the vehicle brakes are applied.

The situation when the vehicle is off or air is otherwise evacuated from the air brake system is illustrated in FIG. 1C. When this occurs, air is absent from the parking and service chambers 18 and 20 and the main spring 10 pushes the push rod 32 and actuating rod 14 downward in the direction of arrow 52 so that the vehicle brakes are applied. As illustrated in FIG. 1D, the actuating rod may be raised, as indicated by arrow 54, and the main spring mechanically caged, through use of a release tool so that the vehicle may be moved even though there is no air in the vehicle brake system.

In accordance with the present invention, the main spring 10 of FIGS. 1A-1D is replaced with a deflection spring assembly. More specifically, in accordance with the present invention, a pneumatic actuator, indicated in general at 100 in FIGS. 2A and 2B, includes a number of deflection beams or rods 102a-102d. While four deflection rods are illustrated, an alternative number advantageously (as explained below) could be used.

Figure 5:
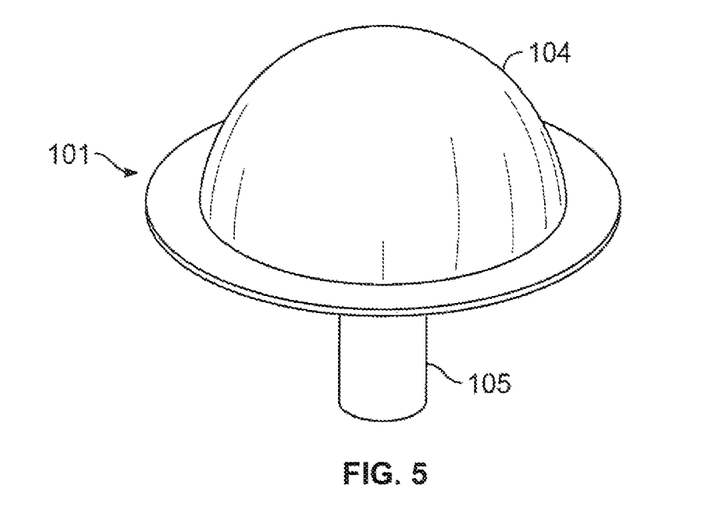
FIG. 5 is an enlarged perspective view of the cam member and push rod of FIGS. 2A and 2B and 3A and 3B.

In addition to the deflection rods 102a-102d, the deflection spring assembly, indicated in general at 103, includes a cam member 101 having a convex hemispherical cam surface 104 (FIGS. 2A, 2B and 5) positioned on top of, and connected to or otherwise provided with, a push rod 105 and upper diaphragm 124 (which corresponds to upper diaphragm 24 of FIGS. 1A-1C). Furthermore, the bottom ends of the deflection rods 102a-102e are provided with followers 106a-106d that engage and travel along the cam surface 104. The followers preferably feature a disc-shaped construction and are attached to the ends of the deflection rod. The followers may be mounted to the ends of the deflection rods in a fixed fashion, being either integrally formed with the deflection rods (as illustrated in FIGS. 2A and 2B) or independently formed and joined to the rods.

Figure 2A:
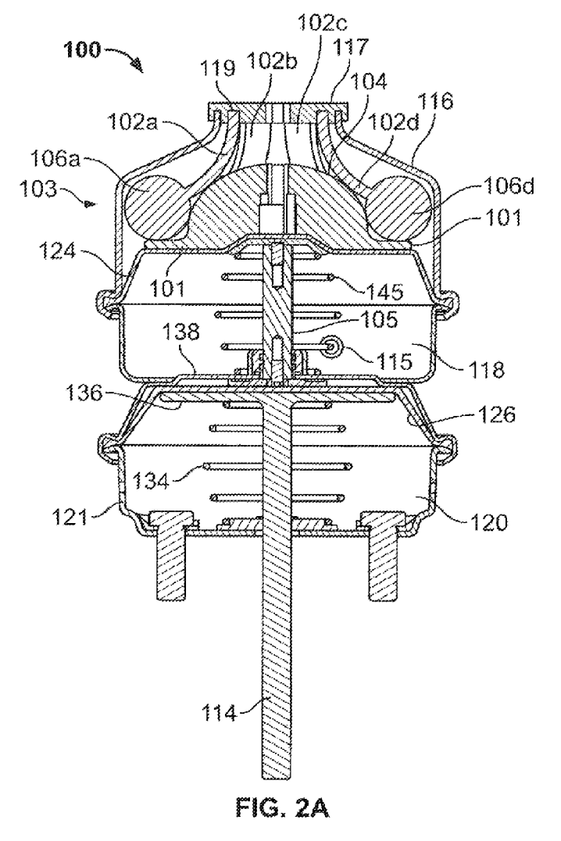
FIGS. 2A and 2B are cross-sectional views of a pneumatic actuator according to a first embodiment of the invention showing the deflected and non-deflected spring conditions, respectively.
Figure 2B:
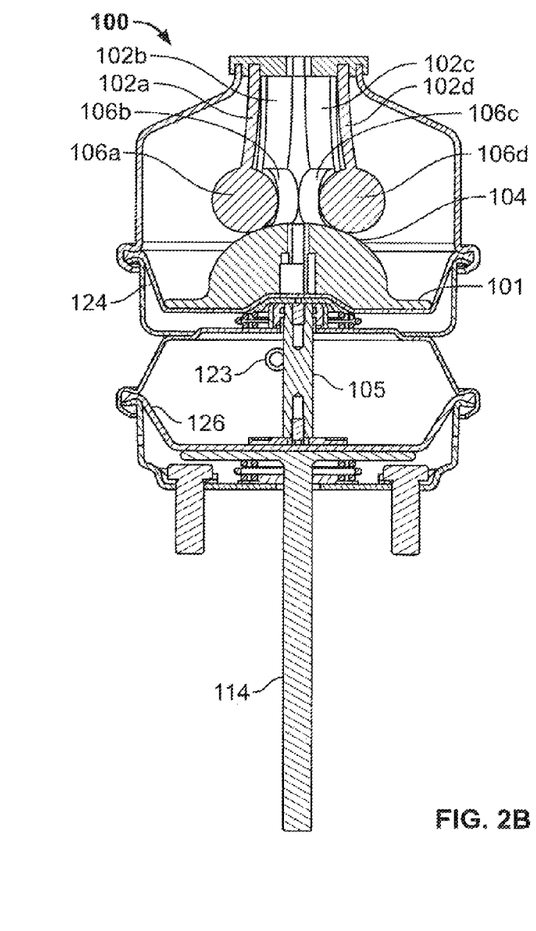

The deflection springs and associated components of FIGS. 2A and 2B are positioned within a parking chamber housing 116 that features top cap 117. The parking chamber housing also includes a port 115 (FIG. 2A) through which pressurized air may selectively be introduced into the parking chamber from a pressurized air source, such as the air brake system of a truck. As illustrated in FIGS. 2A and 2B, the top cap features a number of recesses 119 that receive the top ends of the deflection rods 102a-102d. The forces acting on the deflection rods 102a-102d (explained below) keep the top ends of the deflection rods within the recesses of top cap 117, and/or they may be secured in place with adhesive, welding or some other fastening arrangement.

The remaining components of the pneumatic actuator 100 of FIGS. 2A and 2B are similar to the components of the pneumatic actuator of FIGS. 1A-1D and function in the same manner. The parking chamber housing 116 defines a parking chamber 118, while a service chamber housing 121 defines a service chamber 120. The service chamber housing is provided with a port 123 (FIG. 2B) through which pressurized air may be selectively introduced into the service chamber from a source of pressurized air, such as the air brake system of a vehicle. The bottom end of an actuator rod 114 is connected to a lever arm (not shown) of a braking system. The upper diaphragm 134 is positioned within the parking chamber while a lower diaphragm 126 is positioned in the service chamber. A lower compression spring 134 is mounted between a lower plate 136, which is mounted to the top end of the actuator rod 114 and the lower diaphragm, and the bottom of the service chamber housing 121. A divider wall 138 separates the parking and service chambers and has a central opening through which the push rod 105 passes. An upper compression spring 145 is positioned between the top side of the divider wall 138 and the bottom of upper diaphragm 124 and the cam member 101.

Figure 3A:
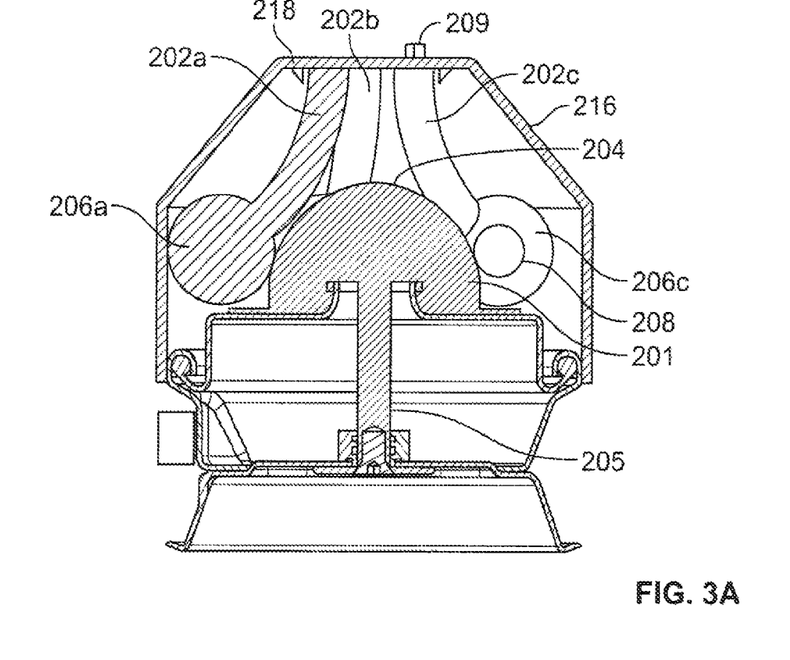
FIGS. 3A and 3B are cross-sectional views of the top portion of an air chamber equipped with a second embodiment of the deflection spring of the invention showing the deflected and non-deflected spring conditions, respectively.
Figure 3B:
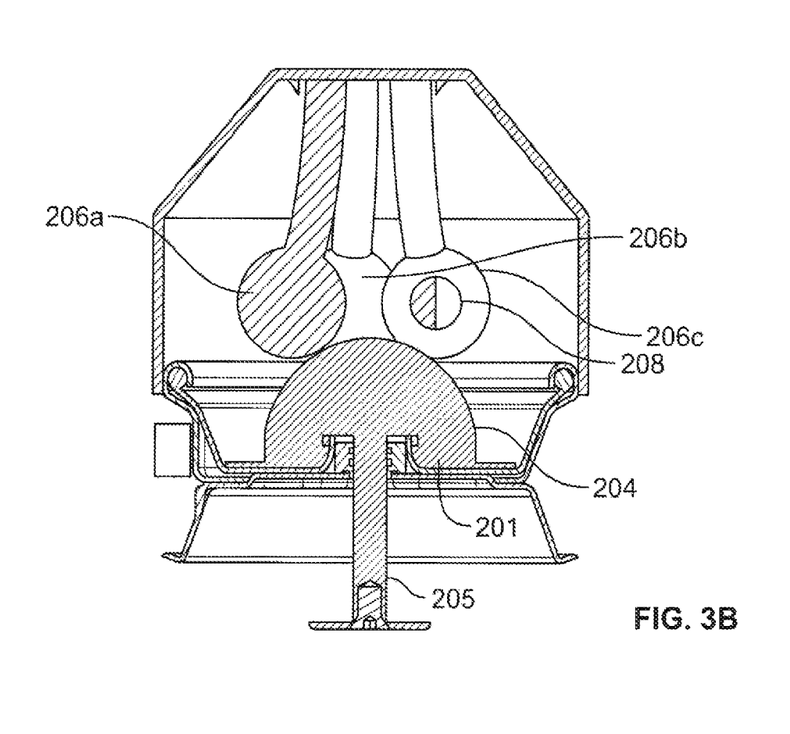

In an alternative embodiment, illustrated in FIGS. 3A and 3B, three followers 206a-206c are mounted upon three deflection rods 202a-202c. In this embodiment, the followers take the form of spherical rollers that pivot, rotate or otherwise turn about an axle as illustrated at 208 for follower 206c) with respect to the bottom ends of the deflection rods. Alternatively, the spherical followers may be mounted to or integrally formed with the deflection rods in a fixed fashion as illustrated by follower 206a). In the embodiment of FIGS. 3A and 3B, the deflection springs and associated components are positioned within an air chamber housing 216. The top ends of the deflection rods 202a-202c are mounted in such a way that they rest inside a recess or recesses formed within the inner surface of the top of the housing 216, deformations (218) or an annular projection or ridge formed in or on the interior surface near the center of the top of the housing. The resulting forces keep the top ends of the deflection rods in place within the housing. Alternatively, the top ends of the deflection rods may be mechanically fastened or joined to the housing using, as examples, only, a fastener, such as a screw or bolt (209 in FIG. 2A), adhesive or welding. In addition, in the embodiment of FIGS. 3A and 3B, the push rod 205 is integrally formed with the cam member 201, which has a convex hemispherical cam surface 204 (like cam member 101 of FIGS. 2A, 2B and 5).

Figure 4A:
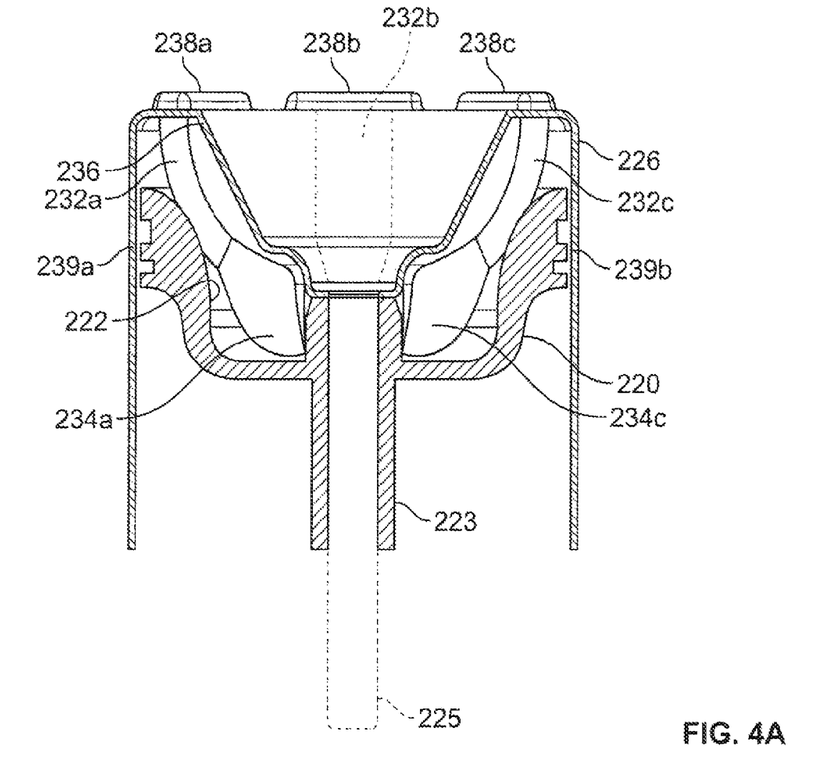
FIGS. 4A and 4B are cross-sectional views of a top portion of an air chamber equipped with a third embodiment of the deflection spring of the invention showing the deflected and non-deflected spring conditions, respectively.
Figure 4B:
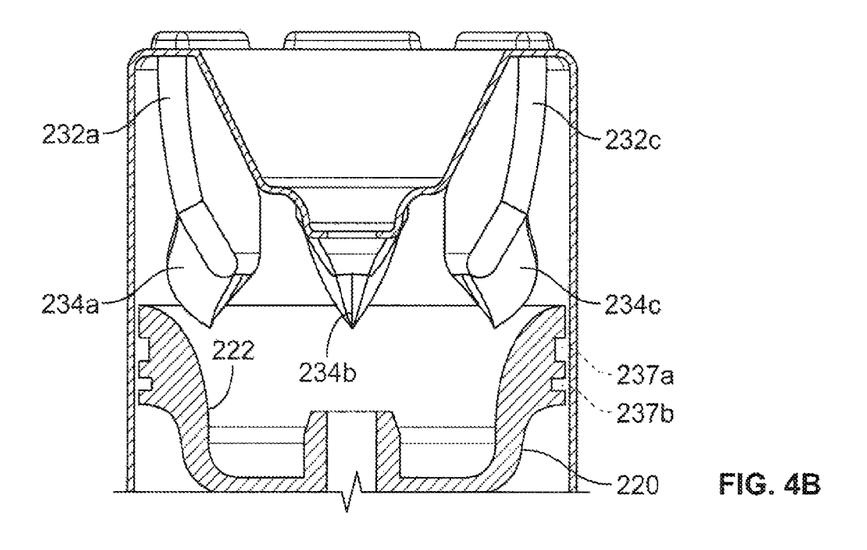
Figure 6:
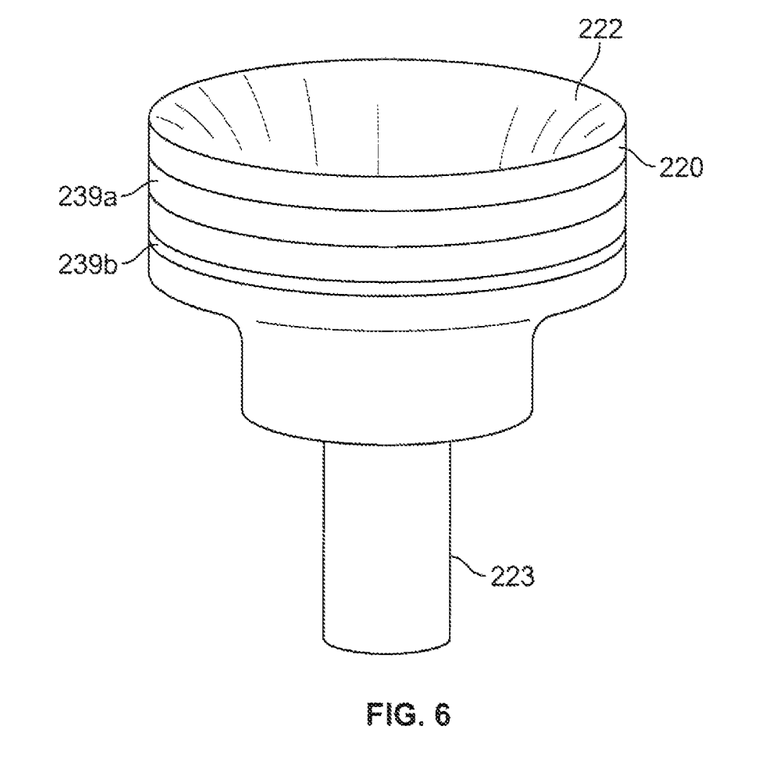
FIG. 6 is an enlarged perspective view of the cup-shaped cam member and central sleeve of FIGS. 4A and 4B.

In yet another alternative embodiment of the invention, illustrated in FIGS. 4A and 4B, the cam member having a hemispherical cam surface of FIGS. 2A and 2B is replaced with a cup-shaped cam member 220 (also shown in FIG. 6) having walls with internal surfaces that form a concave annular cam surface 222. The cup-shaped cam member has a central sleeve 223 that acts as a push rod (32 of FIGS. 1A-1D) and receives the top end of the actuator rod (225 in FIG. 4A). Similar to the embodiment of FIGS. 2A and 2B, deflection rods 132a-132c are provided with followers 234a-234c which are shaped to engage and travel along the concave annular cam surface 222 of the cup-shaped cam member 220. While three deflection rods are shown, an alternative number may advantageously be used. In addition, while the followers 234a-234c are shown as fixed to the bottom ends of the deflection rods 232a-232c, they alternatively may take the form of rollers, as illustrated for follower 206c in the embodiment of FIGS. 3A and 3B. The housing 226 of the air chamber features a central recess 236 that limits the upwards travel of the cup-shaped cam member 220. In this embodiment, the cup-shaped cam member 220 seals against the interior surface of the sides of the cylindrical housing 226 via O-rings 237a and 237b (illustrated in phantom in FIG. 4B) positioned in annular grooves 239a and 239b (also shown in FIG. 6). As a result, the cup-shaped cam member 220 serves as the upper diaphragm for the assembly so that the separate upper diaphragm 124 in the embodiment of FIGS. 2A and 2B (or 24 of FIGS. 1A-1D) is not required.

The top ends of the deflection rods 232a-232e are mounted in such a way that they rest inside an annular recess or recesses (238a-238c), deformations or an annular projection or ridge formed in or on the interior surface near the periphery of the top of the housing. The resulting forces keep the top ends of the deflection rods in place within the housing. Alternatively, the top ends of the deflection rods may be mechanically fastened or joined to the housing.

In operation, the deflection rods resist the deflected condition illustrated in FIGS. 2A, 3A and 4A so that the cam surface, and thus the push rod, is urged downward into the positions illustrated in FIGS. 2B, 3B and 4B. FIGS. 2A, 3A and 4A correspond to the brake system configurations of FIGS. 1A, 1B and 1D, while FIGS. 2B, 3B and 4B correspond to the brake system configuration of FIG. 1C.

In choosing the size of followers 106a-106d (FIGS. 2A and 2B), 206a-206c (FIGS. 3A and 3B) or 234a-234c (FIGS. 4A and 4B), one must keep in mind that with a static system, any spherical object with an applied force on it has a resulting force through the centroid of the sphere and normal to the plane or surface (convex cam surface 104 of FIGS. 2A and 2B, convex cam surface 204 of FIGS. 3A and 3B or concave cam surface 222 of FIGS. 4A and 4B) that is touching it. With this in mind, it is important to choose an appropriate size spherical or dome-shaped contact that will allow the attaching rod or beam (deflection rods) to not contact the cam surface such that the resulting free body diagrams can be simplified.

When the follower (sphere or dome-shaped surface) and deflection rod are in their resting state (no deflection), there is no horizontal force component and everything is in the vertical direction. As this is not a stable condition, the sphere and rod are installed such that there is a slight deflection of the deflection rods when in the condition of FIGS. 2B, 3B and 4B thereby assuring the proper direction of travel. The resulting small horizontal force is relatively negligible in comparison to the vertical component.

As the cam surface moves upward between the positions of 2B and 2A, 3B and 3A or 4B and 4A, thereby releasing the brake, the vertical force component of the roller against the cam surface gets smaller and smaller while the horizontal component gets larger and larger. Care must be taken to not pass the point where all of the force goes to the horizontal components as this would be another unstable condition and the cam surface could then continue up and then the beam and sphere assembly would be physically holding the brake off.

Figure 7:
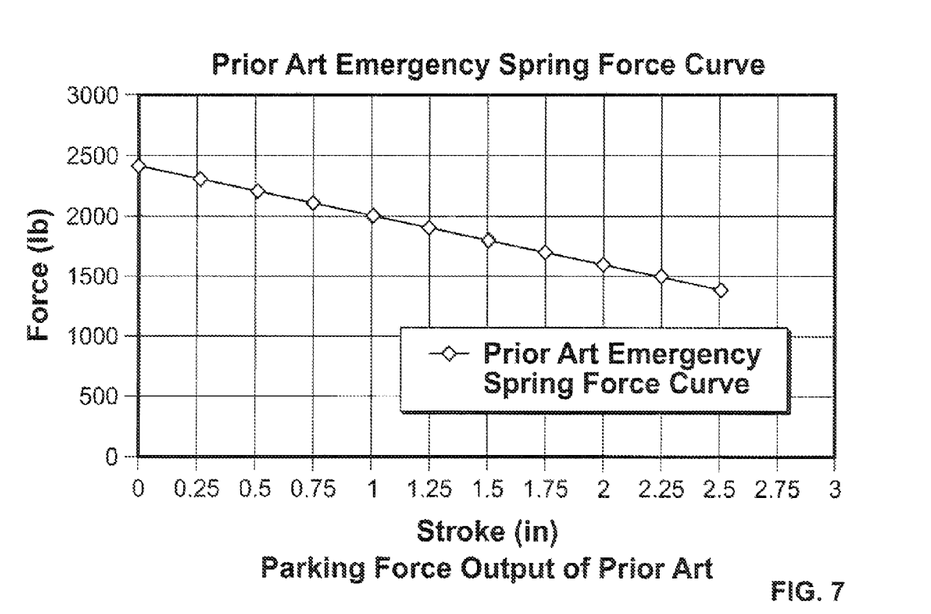
FIG. 7 is a graph of a force curve illustrating the parking force provided by a prior art main spring.
Figure 8:
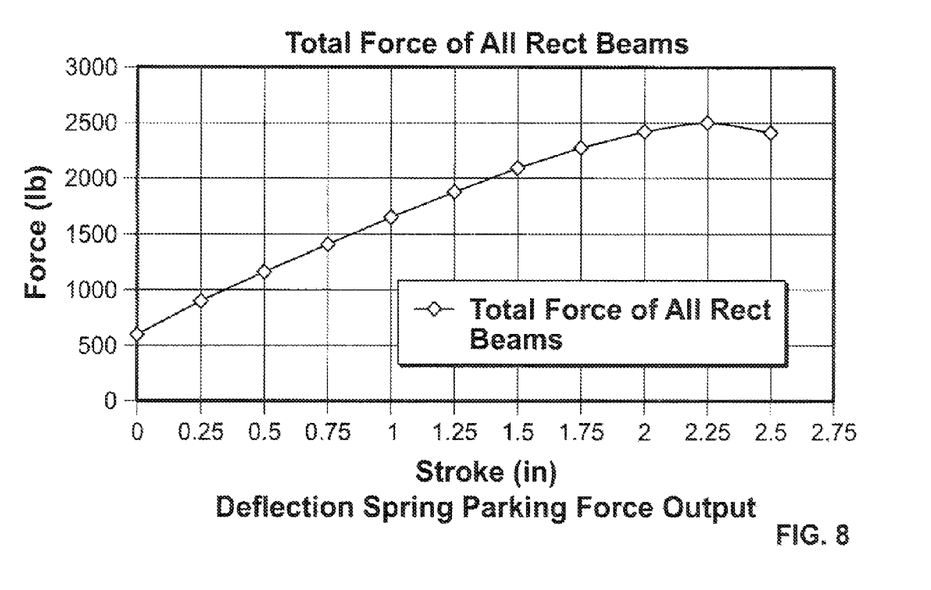
FIG. 8 is a graph of a force curve illustrating the parking force provided by an embodiment of the deflection spring of the invention.

The embodiment of the invention described above therefore takes advantage of the deflection of a beam or rod and the resulting horizontal and vertical force components seen by a cam surface and a follower type of contact. These deflection rods or beams produce a vertical or applied force curve that is the inverse of the current spring design, as illustrated in FIGS. 7 and 8 where the spring curves of a prior art coil compression spring and an embodiment of the deflection spring of the invention are illustrated, respectively. As a result, the more distance the actuator rod travels downward (so as to drop or extend) in the embodiments of FIGS. 2A-6, the stronger the deflection spring force (FIG. 8) gets, as opposed to the prior art compression coil spring which loses force (FIG. 7) the more the actuator rod drops or extends. In addition, when the brake is released (FIGS. 2A, 3A and 4A), the vertical force required to hold off the brake is minimal as most of the force components exerted by the followers on the cam surface are now in the horizontal direction.

The use of deflection rods or beams also enables one to better control the desired force output of the unit by simply adding or removing deflection rods. Corrosion of the spring is not as relevant as the preferred deflection rod material includes carbon fiber or aramid reinforced materials, which exhibit high tensile strengths and flexibility. Other materials that exhibit at least a semi-elastic behavior may be alternatively used. By using an embodiment of the deflection spring of the invention, there is also a possibility of reducing the overall weight of the air chamber, which lowers the amount of stress seen by the mounting bolts.

While the preferred embodiments of the invention have been shown and described, it will be apparent to those skilled in the art that changes and modifications may be made therein without departing from the spirit of the invention, the scope of which is defined by the appended claims.

What is claimed is:

1. A pneumatic actuator comprising:
   a) a housing defining a chamber;
   b) a diaphragm positioned within the chamber;
   c) a rod member attached to the diaphragm, said rod member movable between first position and a second position;
   d) a cam member attached to the diaphragm and to the rod member, said cam member having a cam surface;
   e) a deflection rod having a first end portion and a second end portion, wherein the first end portion of the deflection rod is attached to the housing and the second end portion of the deflection rod is movable along the cam surface;
   f) a follower attached to the second end portion of the deflection rod, said follower engaging the cam surface of the cam member so as to urge the rod member towards the second position.

2. The pneumatic actuator of claim 1 wherein the rod member is a push rod.

3. The pneumatic actuator of claim 1 wherein the cam surface is a convex hemispherical cam surface.

4. The pneumatic actuator of claim 1 wherein the cam member is cup-shaped.

5. The pneumatic actuator of claim 4 wherein the cam surface is a concave annular cam surface.

6. The pneumatic actuator of claim 1 wherein the follower is fixed to the end of the deflection rod.

7. A pneumatic actuator comprising:
   a) a housing defining a chamber;
   b) a diaphragm positioned within the chamber;
   c) a rod member attached to the diaphragm, said rod member movable between first position and a second position;
   d) a cam member attached to the diaphragm and to the rod member, said cam member having a cam surface;
   e) a deflection rod having a first end portion and a second end portion, wherein the first end portion of the deflection rod is attached to the housing;
   f) a follower attached to the second end portion of the deflection rod, said follower engaging the cam surface of the cam member so as to urge the rod member towards the second position;
   wherein the follower includes a roller rotatably attached to the end of the deflection rod.

8. The pneumatic actuator of claim 1 wherein the rod member includes a sleeve adapted to receive an end portion of an actuator rod.

9. The pneumatic actuator of claim 1 wherein the housing includes a cap having a recess and wherein the first end portion of the deflection rod is positioned within the recess.

10. The pneumatic actuator of claim 1 wherein the housing includes a cylindrical shaped portion and the cam member includes an annular groove with an O-ring positioned therein, said O-ring forming a circumferential seal between the cam member and the housing.

11. A deflection spring, assembly for a pneumatic actuator having a housing and a rod member that is movable between a first position and a second position comprising:
 a) a cam member adapted to be attached to the rod member, said cam member having a cam surface;
 b) a deflection rod having a first end portion and a second end portion, wherein the first end portion of the deflection rod is adapted to be attached in the housing and the second end portion of the deflection rod is movable along the cam surface;
 c) a follower attached to the second end portion of the deflection rod, said follower adapted to engage the cam surface of the cam member when the cam member is attached to the rod member and the first end of the deflector rod is attached to the housing so as to urge the rod member towards the second position.

12. The deflection spring assembly of claim 11 wherein the rod member is a push rod.

13. The deflection spring assembly of claim 11 wherein the cam surface is a convex hemispherical cam surface.

14. The deflection spring assembly of claim 11 wherein the cam member is cup-shaped.

15. The deflection spring assembly of claim 14 wherein the cam surface is a concave annular cam surface.

16. The deflection spring assembly of claim 11 wherein the follower is fixed to the end of the deflection rod.

17. A deflection spring, assembly for a pneumatic actuator having a housing and a rod member that is movable between a first position and a second position comprising:
 a) a cam member adapted to be attached to the rod member, said cam member having a cam surface;
 b) a deflection rod having a first end portion and a second end portion, wherein the first end portion of the deflection rod is adapted to be attached to the housing;
 c) a follower attached to the second end portion of the deflection rod, said follower adapted to engage the cam surface of the cam member when the cam member is attached to the rod member and the first end of the deflector rod is attached to the housing so as to urge the rod member towards the second position;
 wherein the follower includes a roller rotatably attached to the end of the deflection rod.

18. The deflection spring assembly of claim 11 further comprising a sleeve attached to the cam member and adapted to receive an end portion of an actuator rod.

19. The deflection spring assembly of claim 11 further comprising a push rod integrally formed with the cam member.

20. The deflection spring assembly of claim 11 wherein the housing includes a cylindrical-shaped portion and the cam member includes an annular groove with an O-ring positioned therein, said O-ring forming a circumferential seal between the cam member and the housing.

* * * * *